(12) United States Patent
Kuwata

(10) Patent No.: US 9,807,311 B2
(45) Date of Patent: Oct. 31, 2017

(54) IMAGING APPARATUS, VIDEO DATA TRANSMITTING APPARATUS, VIDEO DATA TRANSMITTING AND RECEIVING SYSTEM, IMAGE PROCESSING METHOD, AND PROGRAM

(71) Applicant: Koji Kuwata, Kanagawa (JP)

(72) Inventor: Koji Kuwata, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/984,572

(22) Filed: Dec. 30, 2015

(65) Prior Publication Data

US 2016/0198077 A1    Jul. 7, 2016

(30) Foreign Application Priority Data

Jan. 6, 2015  (JP) ................................ 2015-000799

(51) Int. Cl.
*H04N 5/235*    (2006.01)
*H04N 5/232*    (2006.01)
(Continued)

(52) U.S. Cl.
CPC ....... *H04N 5/2353* (2013.01); *H04N 1/00209* (2013.01); *H04N 5/2259* (2013.01);
(Continued)

(58) Field of Classification Search
CPC .. H04N 5/2353; H04N 5/2351; H04N 5/2259; H04N 5/23229; H04N 5/23296; H04N 1/00209; H04N 7/15; H04N 5/2628
See application file for complete search history.

(56) References Cited

U.S. PATENT DOCUMENTS

| 5,812,189 A | * | 9/1998 | Kimura | .............. | H04N 5/23212 348/240.99 |
| 8,189,070 B1 | * | 5/2012 | Brunner | ............... | H04N 5/2351 348/221.1 |

(Continued)

FOREIGN PATENT DOCUMENTS

| JP | 2003-107555 | 4/2003 |
| JP | 2007-306284 A | 11/2007 |

OTHER PUBLICATIONS

Extended European Search Report issued May 9, 2016 in Patent Application No. 16150138.2.

*Primary Examiner* — Gevell Selby
(74) *Attorney, Agent, or Firm* — Oblon, McClelland, Maier & Neustadt, L.L.P.

(57) ABSTRACT

An imaging apparatus includes an imaging section, a signal processor that analyzes video data obtained from the imaging section, calculates a most suitable exposure condition for an entire area of the video data to set the most suitable exposure condition to the imaging section, and outputs most suitable video data imaged on the most suitable exposure condition, a partial area clipping section that clips area video data from a partial area of the most suitable video data to output the area video data, and an exposure condition calculator that calculates a most suitable area exposure condition based on the area video data. The exposure condition calculator sets the most suitable area exposure condition to the imaging section and the signal processor.

7 Claims, 4 Drawing Sheets

(51) Int. Cl.
*H04N 5/262* (2006.01)
*H04N 1/00* (2006.01)
*H04N 7/15* (2006.01)
*H04N 5/225* (2006.01)

(52) U.S. Cl.
CPC ....... *H04N 5/2351* (2013.01); *H04N 5/23229* (2013.01); *H04N 5/23296* (2013.01); *H04N 5/2628* (2013.01); *H04N 7/15* (2013.01)

(56) References Cited

U.S. PATENT DOCUMENTS

| | | |
|---|---|---|
| 2003/0071908 A1 | 4/2003 | Sannoh et al. |
| 2004/0105653 A1* | 6/2004 | Horiuchi .................. H04N 5/76 386/223 |
| 2005/0117025 A1 | 6/2005 | Ambiru et al. |
| 2007/0263909 A1 | 11/2007 | Ojima et al. |
| 2007/0263933 A1 | 11/2007 | Ojima et al. |
| 2007/0263934 A1 | 11/2007 | Ojima et al. |
| 2007/0263935 A1 | 11/2007 | Sanno et al. |
| 2007/0268370 A1 | 11/2007 | Sanno et al. |
| 2011/0007187 A1* | 1/2011 | Mori .................. H04N 5/23219 348/239 |
| 2011/0298886 A1* | 12/2011 | Price .................... H04N 5/2351 348/363 |
| 2012/0307107 A1 | 12/2012 | Brunner |
| 2015/0046581 A1 | 2/2015 | Inoue |
| 2015/0047002 A1 | 2/2015 | Tamura |
| 2015/0071130 A1 | 3/2015 | Okuyama |
| 2015/0111566 A1 | 4/2015 | Nakamura |
| 2015/0133106 A1 | 5/2015 | Nakamura |
| 2015/0149909 A1 | 5/2015 | Nakamura et al. |
| 2015/0149990 A1 | 5/2015 | Nakamura |

\* cited by examiner

FIG.3A

| 1A | 1B | 1C | 1D | 1E | 1F |
|----|----|----|----|----|----|
| 2A | 2B | 2C | 2D | 2E | 2F |
| 3A | 3B | 3C | 3D | 3E | 3F |
| 4A | 4B | 4C | 4D | 4E | 4F |
| 5A | 5B | 5C | 5D | 5E | 5F |
| 6A | 6B | 6C | 6D | 6E | 6F |

FIG.3B

| 1A | 1B | 1C | 1D | 1E | 1F |
|----|----|----|----|----|----|
| 2A | 2B | 2C | 2D | 2E | 2F |
| 3A | 3B | 3C | 3D | 3E | 3F |
| 4A | 4B | 4C | 4D | 4E | 4F |
| 5A | 5B | 5C | 5D | 5E | 5F |
| 6A | 6B | 6C | 6D | 6E | 6F |

FIG.3C

| 1A | 1B | 1C | 1D | 1E | 1F |
|----|----|----|----|----|----|
| 2A | 2B | 2C | 2D | 2E | 2F |
| 3A | 3B | 3C | 3D | 3E | 3F |
| 4A | 4B | 4C | 4D | 4E | 4F |
| 5A | 5B | 5C | 5D | 5E | 5F |
| 6A | 6B | 6C | 6D | 6E | 6F |

IMAGING APPARATUS, VIDEO DATA TRANSMITTING APPARATUS, VIDEO DATA TRANSMITTING AND RECEIVING SYSTEM, IMAGE PROCESSING METHOD, AND PROGRAM

CROSS-REFERENCE TO RELATED APPLICATION

The present application is based on and claims priority to Japanese patent application No. 2015-000799, filed Jan. 6, 2015, the disclosure of which is hereby incorporated by reference herein in its entirety.

BACKGROUND

Technical Field

The present invention relates to an exposure control technique suitable for improving a quality of video data of a partial area sampled from entire video data.

Description of Related Art

A network camera has been known as one example of a conventional imaging apparatus. Such a network camera is used for a TV conference system, a monitoring system, and the like, and has a pan-tilt-zoom (PTZ) function for photographing an entire video image of a photographing target and a background. The network camera has a driving mechanism that changes the optical axis direction of a camera lens in up and down and right and left directions to achieve the pan-tilt function, and an optical mechanism that changes a magnification to achieve a zoom function.

In recent years, a resolution of an image sensor has been enhanced and also a digital signal process (DSP) technique has been remarkably progressed. In the recent network camera, the pan-tilt function is achieved by not an optical mechanism but a digital process to a partial area sampled by scrolling entire video data photographed by a wide-angle lens. A zoom function is also achieved by not an optical mechanism but a digital process.

A digital pan-tilt-zoom function is achieved with a signal process technique for the network camera for use in a TV conference system and the like by performing the most suitable exposure control to entire video data photographed by the wide-angle lens, sampling video data of a required partial area from the entire video data, and enlarging the sampled video data of the partial area with a predetermined digital zoom process.

Japanese Laid-Open Patent Application No. 2003-107555 discloses an imaging apparatus capable of appropriately exposing a target figure regardless of a position and an area of a figure in a screen.

When the video data of the partial area is sampled by scrolling the entire video image with the pan-tilt operation, the video data of the partial area is actually displayed on the monitor. A level of such video data differs depending on an area, for example, such video data may be too dark or too bright. For this reason, a user feels discomfort depending on the video data of the partial area when the user confirms such video data. This is caused by performing the most suitable exposure control only to the entire video data photographed with the wide-angle lens.

SUMMARY

It is, therefore, an object of the present invention to improve a quality of video data of a partial area sampled from entire video data.

To attain the above object, an embodiment of the present invention provides an imaging apparatus including an imaging section; a signal processor that analyses video data obtained from the imaging section, calculates a most suitable exposure condition for an entire area of the video data to set the most suitable exposure condition to the imaging section, and outputs most suitable video data imaged on the most suitable exposure condition; a partial area clipping section that clips area video data from a partial area of the most suitable video data to output the area video data; and an exposure condition calculator that calculates a most suitable area exposure condition based on the area video data, wherein the exposure condition calculator sets the most suitable area exposure condition to the imaging section and the signal processor.

BRIEF DESCRIPTION OF DRAWINGS

FIGS. 3A to 3C are views each showing an entire area of video data that is divided into a plurality of blocks.

DETAILED DESCRIPTION

Hereinafter, an embodiment of the present invention is described with reference to the drawings. According to the embodiment of the present invention, an imaging apparatus includes the following configurations for improving a quality of video data of a partial area sampled from entire video data.

An imaging apparatus according to the embodiment of the present invention includes an imaging section, a signal processor that analyses video data obtained from the imaging section, calculates a most suitable exposure condition for an entire area of the video data to set the most suitable exposure condition to the imaging section, and outputs most suitable video data imaged on the most suitable exposure condition, a partial area clipping section that clips area video data from a partial area of the most suitable video data to output the area video data, and an exposure condition calculator that calculates a most suitable area exposure condition based on the area video data, wherein the exposure condition calculator sets the most suitable area exposure condition to the imaging section and the signal processor. With the above configurations, the most suitable exposure condition is set to the video data of the partial area sampled from the entire video data, so that the quality of the video data of the partial area sampled from the entire video data can be improved.

Figure 1:
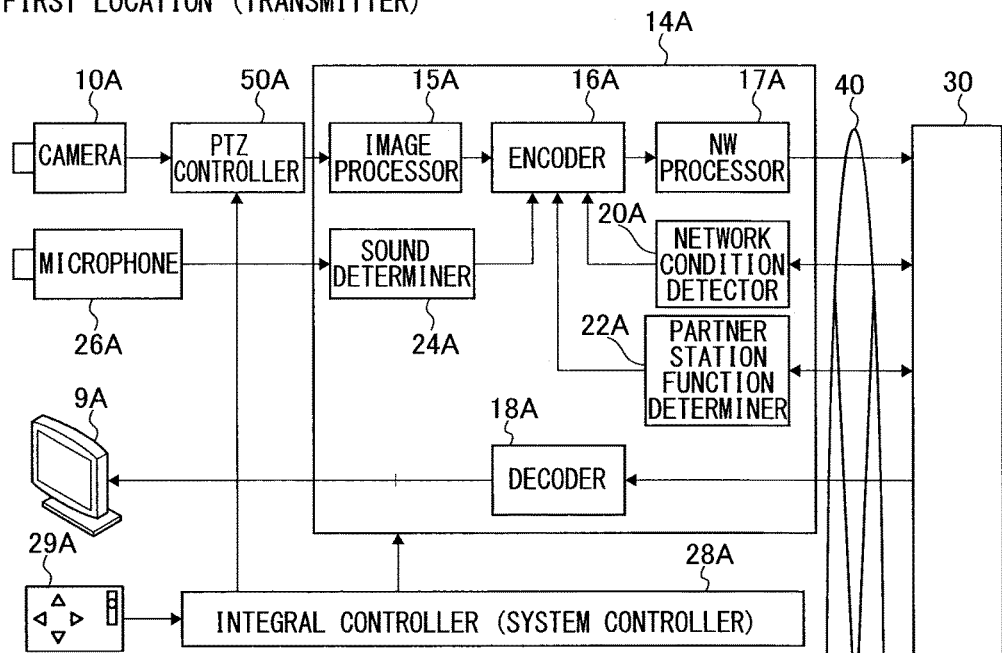
FIG. 1 is a block diagram showing a configuration of a TV conference system as one example of a video transmitting and receiving system according to an embodiment of the present invention.
Figure 1:
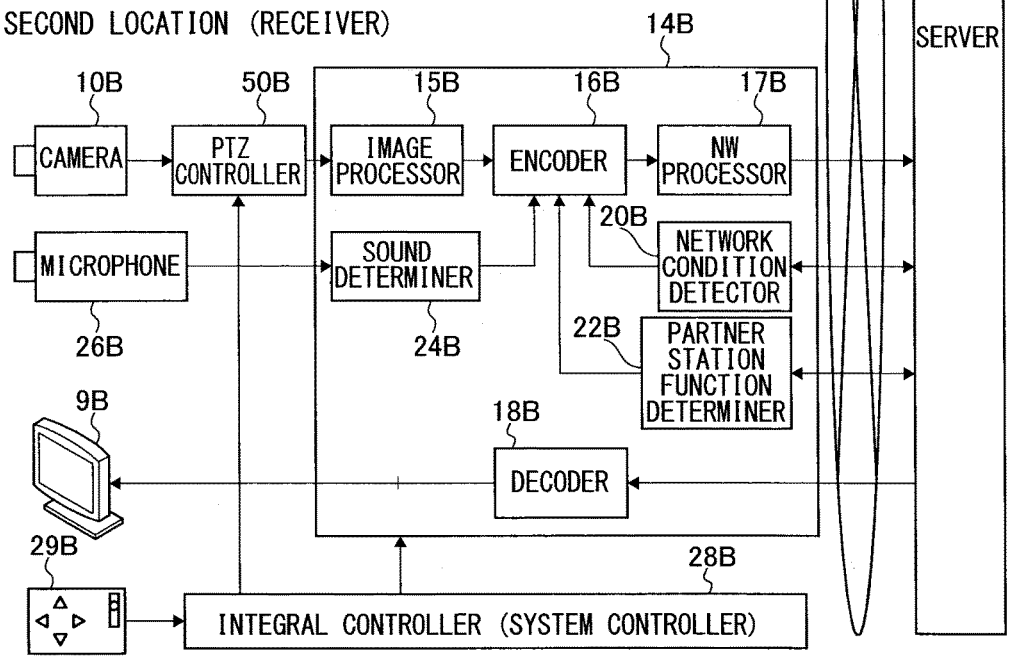

The details of the embodiment of the present invention are described below with reference to the drawings. FIG. 1 is a block diagram showing the configuration of the TV conference system as one example of the video transmitting and receiving system according to the embodiment of the present invention. FIG. 1 only shows components about video data in the TV conference system.

A TV conference system 1 includes a camera 10A, monitor 9A, terminal 14A, microphone 26A, operation section 29A, and pan-tilt-zoom controller (hereinafter, referred to as PTZ controller) 50A which are disposed in a first location. Note that the same components as the first location are disposed in a second location. A server 30 that relays video data and sound is provided between the terminal 14A and the terminal 14B. The terminals 14A and 14B and the server 30 are connected to each other via a network 40 such as the Internet and intranet.

Although the first location is described as a transmitter and the second location is described as a receiver in FIG. 1, the respective components disposed in the respective locations have the same configurations, and can transmit and receive information for use in the TV conference. For example, the camera 10A is disposed in the first location and the camera 10B is disposed in the second location. In the following description, the cameras 10A and 10B are referred to as the camera 10 for simplifying the description in the embodiment. The other components are also referred to as the same manner. The terminal (transmitter) 14 includes an image processor 15 (enlargement processor), encoder 16, network (NW) processor 17, decoder 18, network condition detector 20, partner station decoding function determiner 22, and sound determiner 24.

The image processor 15 performs an enlargement process that generates enlarged video data having a size required for the receiver based on the video data of the area sampled (clipped) from the video data inside the PTZ controller 50, and outputs the enlarged video data to the encoder 16. The image processor 15 may generate the enlarged video data having a size required for the own station in a local mode, and output the data to the monitor 9. The encoder 16 determines a cording level and a transmitting mode based on the information from the network condition detector 20, partner station decoding function determiner 22, and sound determiner 24. Next, the encoder 16 performs a coding process to the video data input from the image processor 15, and transmits the corded video data to the NW processor 17.

The NW processor 17 transfers the corded video data transferred from the encoder 16 to the terminal 14 of a destination via the network 40 such as a LAN (Local Area Network) or the Internet. The decoder 18 decodes the sound signals and the image signals in the corded video data received from the partner station, and outputs the corded signals to the monitor 9 (including speaker). The network condition detector 20 detects the network condition of the network 40, and controls the cording level of the encoder 16 according to the detected condition. The partner station decoding function determiner 22 determines the decoding function of the partner station based on the information showing the decoding performance received form the partner station in accordance with a communication protocol, and outputs the decoding function of the partner station to the encoder 16.

The sound determiner 24 determines a level of the sound signals input from the microphone 26, and outputs the sound signals in a predetermined level or more to the encoder 16. The operation section 29 includes a left button 29L, right button 29R, up button 29U, and down button 29D, and outputs a pressing operation to each button to an integral controller 28 as a pan-tilt direction indication. The operation section 29 includes a slide volume 29Z, and outputs a variation in resistance value by the slide operation, which is performed to the slide volume 29Z, to the integral controller 28 as a zoom ratio instruction. The operation section 29 also includes a button for setting a mode.

The integral controller 28 includes a CPU, ROM, RAM, timer, and user I/F, and performs status management and mode setting of each module or each block in accordance with the instruction input from the operation section 29 by an operator. The integral controller 28 reads out an operating system OS from the ROM to be developed on the RAM, starts up the OS, and reads out the program (process module) from the ROM under the OS management to perform various processes. The integral controller 28 informs the coordinate information of the sampled (clipped) area along with the pan-tilt operation input from the operation section 29 to an imaging area sampling section (partial area clipping section) 51 and a first sampled area exposure controller (exposure condition calculator) 54. The integral controller 28 may receive the PT direction instruction according to the pan-tilt operation via the network 40 from the partner station (destination), for example, in addition to the instruction by the operation process (operation section 29) of the own station in a local mode.

Figure 2:
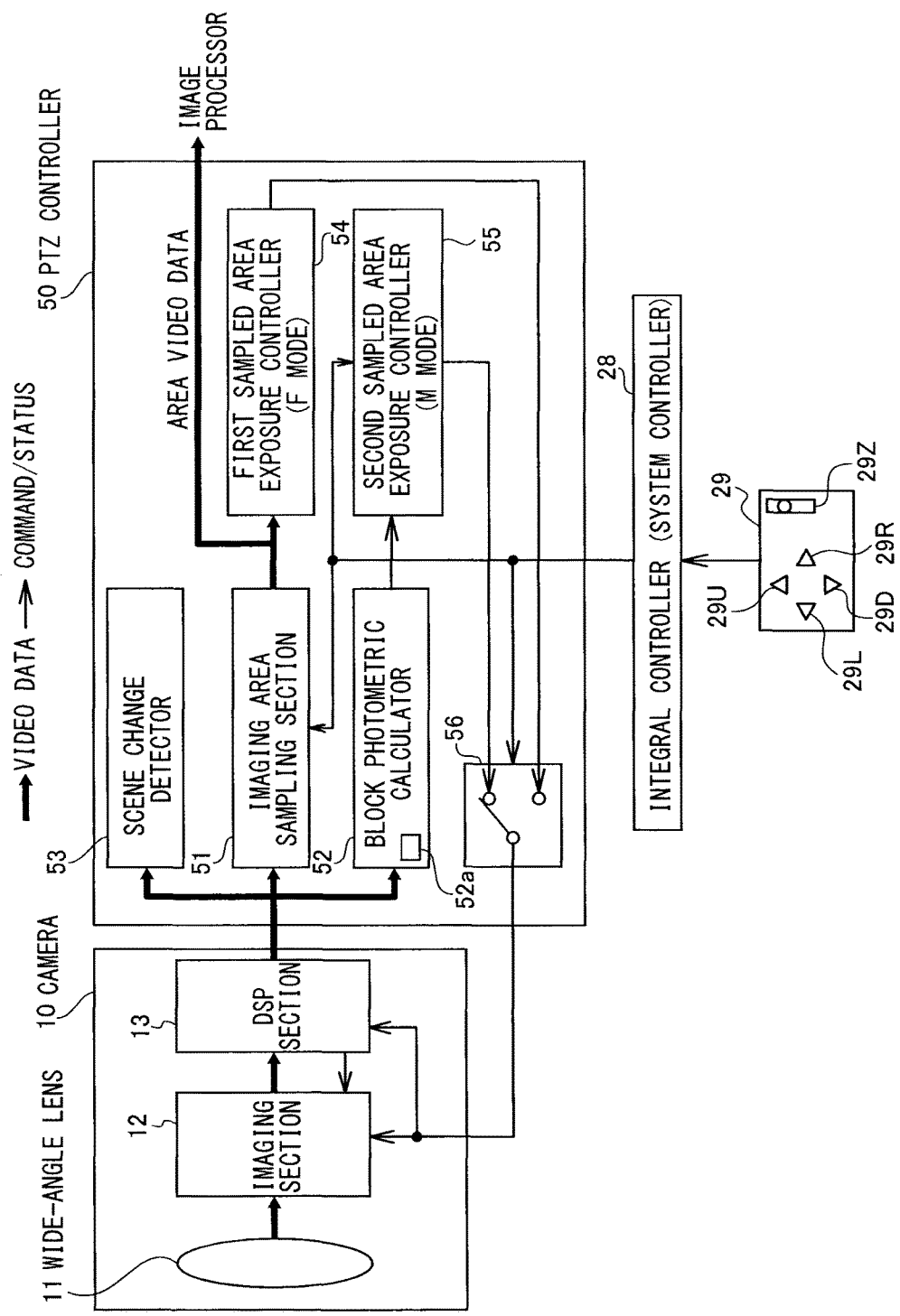
FIG. 2 is a block diagram showing configurations of a PTZ controller and a camera shown in FIG. 1.

FIG. 2 is a block diagram showing the configurations of the camera 10 and the PTZ controller 50 in FIG. 1. The camera 10 includes a wide-angle lens 11, imaging section 12, and DSP section (signal processor) 13. The wide-angle lens 11 has a focal length corresponding to 24 to 35 mm, for example, and is used for photographing the entire area of the entire video image of the background and the photographing target at a wide angle. The wide-angle lens 11 may be a fisheye lens with an equidistance projection method in which an angle and a distance from the center of a screen are proportional. The wide-angle lens 11 transmits light incident from the outside, and images an optical image on an imaging plane.

The imaging section 12 includes an image sensor, and converts video data imaged (condensed) on an imaging plane by receiving the light transmitted through the wide-angle lens 11 into electric signals. The imaging section 12 adjusts the exposure amount of the image sensor based on the exposure time as a photometric condition (exposure condition) set by the DSP section 13 and the PTZ controller 50. The imaging section 12 accumulates the electric charge photoelectrically converted during a period of an exposure time in pixels of the image sensor, and performs timing control to transfer the electric charge accumulated in the pixels during a period of a transfer time. As described above, since the electric charge photoelectrically converted during the exposure time is accumulated in the pixels of the image sensor, the amount of the electric charge to be accumulated in the pixels is decreased as the exposure time is decreased, resulting in lowering in the level of the video data under such conditions. On the other hand, the amount of electric charge to be accumulated in the pixels is increased as the exposure time is increased, resulting in rise in the level of the video data under such conditions. In addition, the imaging section 12 may generate image data by performing the A/D conversion to the electric signals according to the video data. Since the image sensor includes an amplifier circuit that amplifies the electric signals output from each image of the image senor, the gain values of the amplifier circuit may be set as the photometric condition (exposure condition).

The DSP section 13 performs a sheading process to the image data obtained from the imaging section 12 and a signal process known in a camera such as a beyer conversion process. The DSP section 13 may generate image data by applying the A/D conversion to the electric signals obtained from the imaging section 12. The DSP section 13 generates an exposure evaluation value based on the brightness level of the video data, determines (exposure control) the exposure time as the suitable photometric condition (most suitable exposure condition) for the present scene based on the exposure evaluation value, and sets the exposure time in the photometric condition in the imaging section 12. At this point, the photometric condition determined as the most suitable condition for the entire video data generated by the imaging section 12 is set. The DSP section 13 may perform the exposure control by determining (exposure control) the most suitable photometric condition based on the generated exposure evaluation value, and reducing or enlarging the dynamic level in the various processes performed inside the DSP section 13. The DPS section 13 adjusts the exposure amount in the above signal process based on the photometric condition set by the PTZ controller 50.

The PTZ controller 50 shown in FIG. 2 includes the imaging area sampling section 51, a block photometric calculator 52, a scene change detector 53, the first sampled area exposure controller 54, a second sampled area exposure controller 55, and a data switch 56. Each section of the PTZ controller 50 may be a software module. In this case, the PTZ controller 50 may include a ROM, RAM, and CPU. The PTZ controller 50 may be achieved by an integrated circuit or a program with ASIC (Application Specific Integrated Circuit) or an image process processor. The scene change detector 53 creates a histogram for each frame of the entire image data input from the camera 10, and determines whether or not the scene of the entire video data which has been photographed so far is changed to another scene based on the change level of the histogram.

The imaging area sampling section 51 performs an area sampling process to each frame of the video data from the camera 10 while scrolling the sampled (clipped) area of the video data of the entire video data, and outputs the video data (area video data) of the sampled partial area to the image processor 15 and the first sampled area exposure controller 54. The imaging area sampling section 51 achieves a digital pan-tilt function for performing the area sampling process. The area to be sampled has an unfixed size which is determined depending on a resolution of the video data transferred to the partner terminal and the zoom ratio instruction from the integral controller 28.

The first sampled area exposure controller 54 (exposure condition calculator) calculates a most suitable exposure evaluation value based on an average value of a brightness level of the area video data input from the imaging area sampling section 51 when the sampled area has a fixed size without scrolling the display area by the pan-tilt operation, and generates the photometric condition including the exposure time based on the exposure evaluation value. The first sampled area exposure controller 54 feeds back the most suitable photometric condition (most suitable area exposure condition) by setting the photometric condition to the imaging section 12 and the DSP section 13 via the data switch 56. In this case, since the first sampled area exposure controller 54 obtains the photometric condition while monitoring the video data for a partial area in the entire video data output from the camera 10, the feed-back of the photometric condition is delayed with the several frames. The first sampled area exposure controller 54 feeds back the photometric condition of the delayed subsequent frame to the imaging section 12 and the DSP section 13. However, such delay may be allowed since the photographing condition is stable due the sampled area having a fixed size.

The block photometric calculator 52 obtains most suitable video data for the entire image from the DSP section 13. The block photometric calculator 52 calculates the most suitable exposure evaluation value based on the average value of the brightness level of the video data for each video data block by analyzing all of the blocks of the entire video data, and generates the photometric condition including the exposure time based on the exposure evaluation value to store the photometric condition in the memory 52a as a most suitable block exposure condition. The block photometric calculator 52 calculates the most suitable area exposure condition for the partial area by calculating a weighted average value for the exposure condition of each video data block corresponding to the partial area read from the memory 52a. When the video data block including the partial area is only one, the block photometric calculator 52 outputs the most suitable block exposure condition of the video data block.

In addition, the block photometric calculator 52 updates the data by regularly identifying the photometric condition at intervals without continuously calculating the most suitable photometric condition of each block. When the photographing scene is obviously changed, the similar updating process is performed. The second sampled area exposure controller 55 controls the photometric condition based on the most suitable photometric condition (most suitable block exposure condition) input from the block photometric calculator 52 while scrolling the display area by the pan-tilt operation.

Hereinafter, one example of a process that obtains the most suitable exposure time to the brightness level of the partial area is described. In this case, the block photometric calculator 52 and the first sampled area exposure controller 54 may include a ROM having a brightness level and exposure evaluation value conversion table and an exposure evaluation value and exposure time conversion table. The brightness level and exposure evaluation value conversion table stores different brightness levels and different exposure evaluation values that correspond on a one-to-one basis. The exposure evaluation value and exposure time conversion table stores different exposure evaluation values and different exposure times that correspond on a one-to-one basis.

With this configuration, the block photometric calculator 52 and the first sampled area exposure controller 54 obtain the exposure evaluation value from the brightness level and the exposure evaluation value conversion table with the obtained brightness level as a key, and obtain the most suitable exposure time from the exposure evaluation value and exposure time conversion table with the obtained exposure evaluation value as a key. Since the exposure evaluation value and the exposure time conversion table depends on the light-receiving element property of the image sensor, it is preferable for the most suitable exposure time to be changed in accordance with each of the image sensors.

The data switch 56 is a switching circuit that validates one of dual data connection paths, and outputs the photometric condition obtained by the first sampled area exposure controller 54 to the imaging section 12 and the DSP section 13 via the data switch 56 when the data switch 56 is set to a first condition by the integral controller 28. On the other hand, the data switch 56 outputs the photometric condition obtained by the second sampled area exposure controller 55 to the imaging section 12 and the DSP section 13 when the data switch 56 is set to a second condition by the integral controller 28. In addition, the second sampled area exposure controller 55 obtains the photometric condition most suitable for the present sampled area, and sets the most suitable photometric condition to the imaging section 12 and the DSP section 13. The most suitable photometric condition can be therefore fed back to the delayed subsequent frame, but the most suitable photometric condition cannot be reflected while scrolling the sampled area to another area.

In this case, in order to prioritize a real time property, the photometric condition data previously extracted from the memory 52a of the block photometric calculator 52 is read, and the most suitable photometric condition is calculated for the area while being scrolled in the block photometric calculator 52. The integral controller 28 may receive the pan-tilt direction instruction (hereinafter, PT instruction) according to the pan-tilt operation via the network 40 from the partner station (destination), for example, in addition to the pan-tilt direction instruction of the own station.

FIGS. 3A to 3C are views each showing the entire area of the entire video data that is divided into a plurality of blocks. As illustrated in FIG. 3A, the block photometric calculator 52 divides the entire video data (most suitable video data) 71 which can be photographed by the imaging section 12 into 36 blocks 1A to 6F, for example. At the time in which the disposing environment of the camera 10 is fixed (no movement of scene), the block photometric calculator 52 obtains the most suitable photometric condition for each of the blocks 1A to 6F as described above. The obtained most suitable photometric conditions are stored in the memory 52a together with the video data for the respective blocks. In addition, the data stored in the memory 52a of the block photometric calculator 52 is regularly updated. For example, when it is determined that a peripheral environment is changed, the data stored in the memory 52a is updated by repeating the same process.

As illustrated in FIG. 3B, the sampled area at a certain point during the scrolling is an area 73 including the blocks 2B, 2C, 2D, 3B, 3C, 3D, 4B, 4C, and 4D, for example. During the scrolling, the block photometric calculator 52 obtains an occupancy $S_{2B}$ to $S_{4D}$ according to the area (the number of pixels) of each block with respect to the area (the number of pixels) of the sampled area 73. Next, the block photometric calculator 52 obtains a coefficient $k_{2B}$ to $k_{4D}$ ($k_{2B}+ \ldots +k_{4D}=1$) of each block for use in the weighted average from the occupancy $S_{2B}$ to $S_{4D}$ according to the area of each block. The block photometric calculator 52 obtains the photometric condition AE according to the sampled area 73 from the following equation where $AE_{2B}$ to $AE_{4D}$ is the most suitable photometric condition of each block read from the memory 52a.

$$AE=k_{2B}*AE_{2B}+k_{2C}*AE_{2C}+ \ldots +k_{4D}*AE_{4D}$$

The block photometric calculator 52 obtains the exposure time $T_{AE}$ from the photometric condition AE to be set as the photometric condition (exposure time $T_{AE}$) according to the sampled area 73. This photometric condition (exposure time $T_{AE}$) is set to the photometric condition (exposure time $T_{AE}$) of the imaging section 12 and the DSP section 13 via the block photometric calculator 52, second sampled area exposure controller 55, and data switch 56 according to the control by the integral controller 28.

As shown in FIG. 3C, when the size and the position of a sampled area 75 coincide with the size and the position of the divided block (for example, block 5E), the photometric condition (exposure time T) of the sampled area coincides with the most suitable photometric condition of the block 5E. In this case, the block photometric calculator 52 outputs the most suitable photometric condition of the block read from the memory 52a to the second sampled area exposure controller 55.

Figure 4:
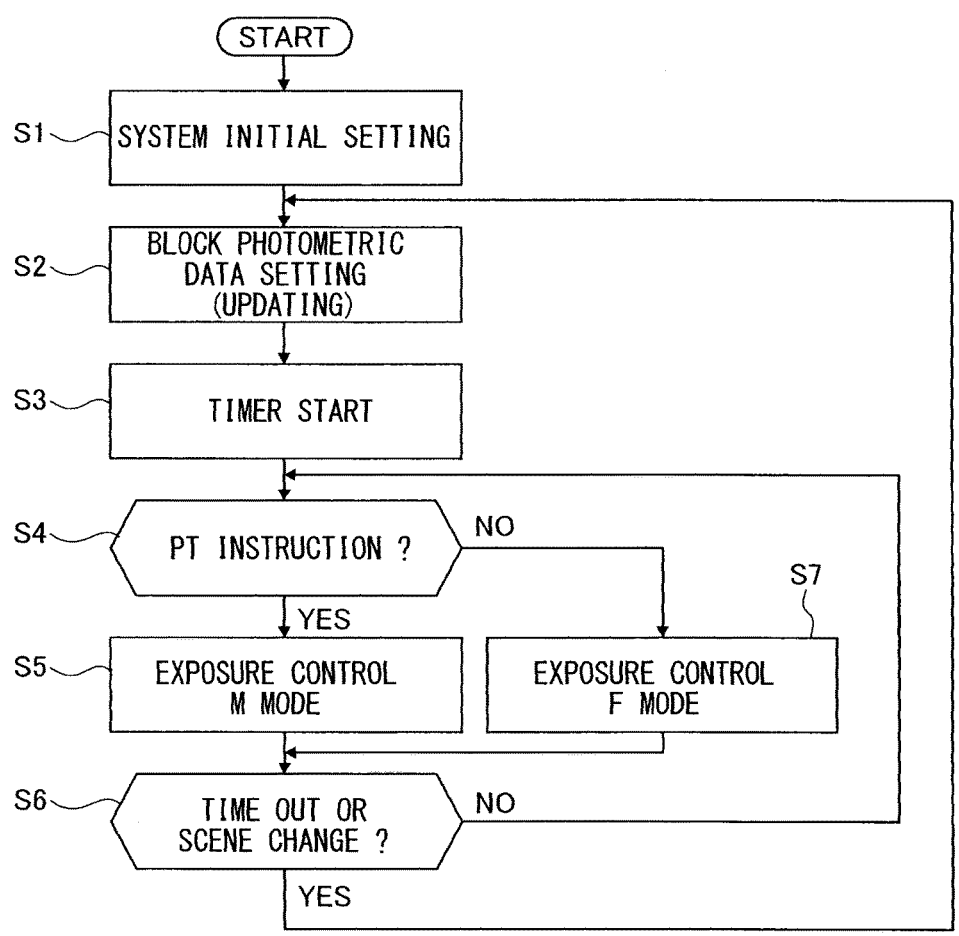
FIG. 4 is a flowchart showing a loading operation of a camera video image by an integral controller for use in the TV conference system according to the embodiment of the present invention.

FIG. 4 is a flowchart showing an operation of loading a camera video data by the integral controller 28 that is used for the TV conference system according to the embodiment of the present invention. In Step S1, the integral controller 28 performs initial setting to each component (module) in startup to set the camera 10 to be photographable in real time. By performing the initial setting in Step S1, each component of the imaging section 12 and the PTZ controller 50 performs a real time process.

Next, in Step S2, the integral controller 28 controls the block photometric calculator 52 to divide the entire video data in a plurality of blocks and calculate the most suitable photometric condition (most suitable block exposure condition) for each block. The block photometric calculator 52 analyses all of the video data blocks of the entire video data based on this control. More specifically, the brightness data $Y_{1A}$ to $Y_{6F}$ is calculated for each block 1A to 6F as a photometric target based on the image data (each pixel data (R, G, B)). The equation of the brightness data is shown below. In the following equation, $R_n$, $G_n$, and $B_n$ (n is 1A to 6F) represent an average value of each pixel data (R, G, B) in each block.

$$Y_n=0.299R_n+0.587G_n+0.114B_n$$

When the photometric process is performed only in each block, each brightness data of the block is calculated, and the average value of the calculated brightness data of the block is set as the brightness data $Y_n$ (AE evaluation value). In the example shown in FIG. 3A, the average value of the brightness data is set as the brightness data $Y_n$ (AE evaluation value) for each block 1A to 6F. The block photometric calculator 52 calculates the most suitable exposure evaluation value based on the average value of the brightness level of the video data for each video data block, generates the photometric condition including the exposure time based on the exposure evaluation value, and stores the photometric condition in the memory 52a as the most suitable block exposure condition. The block photometric calculator 52 identifies the most suitable photometric condition for all of the blocks, and stores the data in the memory 52a to update the stored data. As described above, by dividing the most suitable video data into a plurality of video data blocks, and calculating the most suitable block exposure condition for each video data block to be stored, the most suitable block exposure condition for each video data block can be used according to needs.

Next, in step S3, the integral controller 28 sets a timer to a time T to start counting from 0. Next, in step S4, the integral controller (operation determiner) 28 determines the PT instruction according to the pan-tilt operation from the operation section 29 as a scrolling operation. The flow proceeds to Step S5 with the PT instruction while the flow proceeds to Step S7 with the no PT instruction.

In Step S5, the integral controller 28 determines the sampled area as being scrolled with the PT instruction as the scroll operation, and sets the data switch 56 to the second condition. In this case, the block photometric calculator 52 obtains the occupancy $S_{2B}$ to $S_{4D}$ according to the area (the number of pixels) of each block with respect to the sampled area 73, for example. Next, the block photometric calculator 52 obtains a coefficient $k_{2B}$ to $k_{4D}$ ($k_{2B}+ \ldots +k_{4D}=1$) of each block for use in the weighted average value from the occupancy $S_{2B}$ to $S_{4D}$ according to the area of each block. The block photometric calculator 52 obtains the photometric condition AE according to the sampled area 73 from the following equation where $AE_{2B}$ to $AE_{4D}$ is the most suitable photometric condition for each block read from the memory 52a.

$$AE=k_{2B}*AE_{2B}+k_{2C}*AE_{2C}+ \ldots +k_{4D}*AE_{4D}$$

The block photometric calculator 52 obtains the exposure time $T_{AE}$ from the photometric condition AE to be set as the photometric condition (exposure time $T_{AE}$) according to the sampled area 73. The block photometric calculator 52 outputs the photometric condition (exposure time $T_{AE}$) to the second sampled area exposure controller 55.

The second sampled area exposure controller 55 controls the photometric condition based on the most suitable photometric condition input from the block photometric calculator 52. The photometric condition obtained by the second sampled area exposure controller 55 is set to the imaging section 12 and the DSP section 13 via the data switch 56, and the imaging section 12 and the DSP section 13 photograph with the photometric condition. The imaging section 12 and the DSP section 13 thereby adjust the exposure amount of the entire video data of the image sensor by the exposure time in the photometric condition (exposure condition) set by the second sampled area exposure controller 55.

When the pan operation or the tilt operation is input, the block photometric calculator 52 calculates the most suitable area exposure condition according to the partial area based on the most suitable block exposure condition for each video data block corresponding to the partial area obtained from the memory 52a, and sets the most suitable area exposure condition to the imaging section 12 and the DSP section 13. The area video data photographed on the most suitable area exposure condition is thereby output, so that the quality of the video data of the partial area sampled from the entire video data can be improved.

On the other hand, in Step S7, the integral controller 28 determines that the sampled area of the video data has a fixed size without being scrolled with no PT instruction, and sets the data switch 56 to the first condition. In this case, the imaging area sampling section 51 performs the area sampling process to each frame of the video data from the camera 10, and outputs the video data of the sampled area to the image processor 15 and the first sampled area exposure controller 54. The first sampled area exposure controller 54 calculates the most suitable evaluation value based on the average value of the brightness level of the area video data input from the imaging area sampling section 51, and generates the photometric condition including the exposure time based on the exposure evaluation value.

Next, the photometric condition (most suitable area exposure condition) obtained by the first sampled area exposure controller 54 is set to the imaging section 12 and the DSP section 13 via the data switch 56, and the imaging section 12 and the DSP section 13 photograph with the photometry condition (most suitable area exposure condition). The imaging section 12 and the DSP section 13 thereby adjust the exposure amount of the entire video data of the image sensor by the exposure time included in the photometric condition (most suitable exposure condition) set by the first sampled area exposure controller 54.

The image processor 15 performs the enlargement process that generates enlarged video data having a size required for the receiver based on the video image data of the area sampled from the video data by the imaging area sampling section 51, and outputs the enlarged video data to the encoder 16. As described above, the area video data is clipped from the partial area of the most suitable video data to be output, the most suitable area exposure condition is calculated based on the area video data, and the most suitable area exposure condition is set to the imaging section 12 and the DSP section 13. The area video data imaged on the most suitable area exposure condition can be output, and the quality of the video data of the partial area sampled from the entire video data can be improved.

Next, in Step S6, the integral controller 28 determines whether or not the counted value has reached to the time T set by the timer. The integral controller 28 obtains the detection result from the scene change detector 53, and determines whether or not the scene of the entire video image that has been photographed so far is changed to another scene. When the time out is not occurred in the determination of Step S6, or the scene change is not occurred, the flow returns to the Step S4, and the integral controller 28 repeats the above process. On the other hand, when the time out is occurred or the scene change is occurred in the determination in Step S6, the flow returns to the Step S2, and the integral controller 28 repeats the above processes to update the block photometric data.

In the present embodiment, although the characteristic configurations, functions, and effects of the imaging section 12 and the PTZ controller 50 of the camera 10 for use in a TV conference system are described, these can be applied to a system such as a monitoring camera.

The configurations, functions, and effects of examples according to the embodiment of the present invention are described below.

First Example

The imaging apparatus includes the imaging section 12, the DSP section (signal processor) that analyses the video data obtained from the imaging section 12, calculates the most suitable exposure condition for the entire area of the video data to set the most suitable exposure condition to the imaging section 12, and outputs the most suitable video data imaged on the most suitable exposure condition, the imaging area sampling section 51 (partial area clipping section) that clips the area video data from the partial area of the most suitable video data to output the area video data, and the first sampled area exposure controller 54 (exposure condition calculator) that calculates the most suitable area exposure condition based on the area video data. The first sampled area exposure controller 54 sets the most suitable area exposure condition to the imaging section 12 and the DSP section 13.

According to First Example, by clipping the area video data from the partial area of the most suitable video data, calculating the most suitable area exposure condition based on the area video data, and setting the most suitable area exposure condition to the imaging section 12 and the DSP section 13; the area video data imaged on the most suitable area exposure condition can be output, and the quality of the video data of the partial area sampled from the entire video data can be improved.

Second Example

The imaging apparatus includes the memory 52a and the block photometric calculator 52 that divides the most suitable video data obtained from the DSP section 13 (signal processor) into a plurality of video data blocks, and calculates the most suitable block exposure condition for each of the video data blocks to store the most suitable block exposure condition in the memory 52a.

According to Second Example, by dividing the most suitable video data into a plurality of video data blocks and calculating the most suitable block exposure condition for each of the video data blocks to store the most suitable block exposure condition, the most suitable block exposure condition for each of the video data blocks can be used according to needs.

Third Example

The imaging apparatus includes the integral controller 28 (operation determiner) that determines input of the pan operation or the tilt operation. When the pan operation or the tilt operation is input, the block photometric calculator 52 calculates the most suitable area exposure condition for the partial area based on the most suitable block exposure condition for each of the video data blocks corresponding to the partial area obtained from the memory 52*a*, and sets the most suitable area exposure condition to the imaging section 12 and the DSP section 13.

According to Third Example, when the pan operation or the tilt operation is input, by calculating the most suitable area exposure condition according to the partial area based on the most suitable block exposure condition for each video data block corresponding to the partial area obtained from the memory 52*a* and setting the most suitable area exposure condition to the imaging section 12 and the DSP section 13; the area video data imaged on the most suitable area exposure condition can be output, and the quality of the video data of the partial area sampled from the entire video data can be improved.

Fourth Example

The block photometric calculator 52 calculates the most suitable area exposure condition by calculating the weighted average value for the most suitable block exposure condition for each of the video data blocks corresponding to the partial area.

According to Fourth Example, by the most suitable area exposure condition by calculating the weighted average value for the most suitable block exposure condition for each of the video data blocks corresponding to the partial area, the most suitable area exposure condition can be set to the imaging section 12 and the DSP section 13, the area video data imaged on the most suitable area exposure condition can be output, and thus, the quality of the video data of the partial area sampled from the entire video data can be improved.

Fifth Example

When the video data block including the partial area is only one, the block photometric calculator 52 outputs the most suitable block exposure condition for the video data block.

According to Fifth Example, by outputting the most suitable block exposure condition for the video data block when the video data block including the partial area is only one, the most suitable area exposure condition for each of the video data blocks can be set to the imaging section 12 and the DSP section 13, and thus, the quality of the video data of the partial area sampled from the entire video data can be improved.

Sixth Example

A video data transmitting apparatus includes the imaging apparatus according to any one of First to Fifth Examples, the image processor 15 (enlargement processor) that generates the enlarged video data having a required size based on the area video data clipped by the imaging area sampling section 51 (partial area clipping section), and the terminal 14 (transmitter) that transmits the enlarged video data to a video data receiver of the partner station via the network 40.

According to Sixth Example, by generating the enlarged video data having a required size based on the area video data clipped from the partial area and transmitting the enlarged video data to the vide data receiver of the partner station via the network 40, the enlarged video data having an improved quality of the area video data can be provided to the video data receiver of the partner station.

Seventh Example

A video data transmitting and receiving system includes the video data transmitting apparatus according to Sixth Example, and a video data receiver that receives the enlarged video data from the video data transmitting apparatus to display the enlarged video data.

According to Seventh Example, the video data transmitting and receiving system including the video data transmitting apparatus and the video data receiver that receives the enlarged video data from the video data transmitting apparatus to display the enlarged video data can be provided.

Eighth Example

An image processing method with the imaging apparatus according to any one of First to Fifth Examples, the method includes the step (S7) of clipping the area video data from the partial area of the most suitable video data to output the area video data, and the step (S7) of calculating the most suitable area exposure condition based on the area video data. The step (S7) of calculating the most suitable area exposure condition sets the area exposure condition to the imaging section 12 and the DSP section 13 (signal processor).

According to Eighth Example, by clipping the area video data from the partial area of the most suitable video data, calculating the most suitable area exposure condition based on the area video data, and setting the most suitable area exposure condition to the imaging section 12 and the DSP section 13; the area vide data imaged on the most suitable exposure condition can be output, and the quality of the video data of the partial area sampled from the entire video data can be improved.

Ninth Example

A non-transitory computer-readable computer medium storing a program is provided, and the program executes each of the steps in Eighth Example by a processor. According to Ninth Example, each of the steps can be executed by the processor.

Although the present invention has been described in terms of exemplary embodiment, it is not limited thereto. It should be appreciated that variations or modifications may be made in the embodiment described by persons skilled in the art without departing from the scope of the present invention as defined by the following claims.

What is claimed is:

1. An imaging apparatus comprising:
an imaging sensor;
a signal processor that analyses video data obtained from the imaging sensor, calculates a suitable exposure condition for an entire area of the video data to set the suitable exposure condition to the imaging sensor, and outputs suitable video data imaged on the suitable exposure condition;
a memory; and
processing circuitry configured to perform:
clipping area video data from a partial area of the suitable video data to output the area video data; and
calculating a suitable area exposure condition based on the area video data, wherein the calculating sets the suitable area exposure condition to the imaging sensor and the signal processor, wherein the processing circuitry is further configured to perform a block photometric calculating that divides the suitable video data obtained from the signal processor into a plurality of video data blocks, and calculates a suitable block exposure condition for each of the video data blocks to store the suitable block exposure condition in the memory, wherein the block photometric calculating calculates the suitable area exposure condition by calculating a weighted average value for the suitable block exposure condition for each of the video data blocks corresponding to the partial area, and wherein when a region having a plurality of video data blocks in the partial area does not conform to the partial area, a weighted average value is a total of a coefficient multiplied by an exposure time based on an occupancy to the partial area of the video data blocks, and wherein the exposure condition is an exposure time.

2. The imaging apparatus according to claim 1, wherein when the video data blocks including the partial area is only one, the block photometric calculating outputs the suitable block exposure condition for the one video data block.

3. An imaging apparatus comprising:
an imaging sensor;
a signal processor that analyses video data obtained from the imaging sensor, calculates a suitable exposure condition for an entire area of the video data to set the suitable exposure condition to the imaging sensor, and outputs suitable video data imaged on the suitable exposure condition;
a memory; and
processing circuitry configured to perform:
  clipping area video data from a partial area of the suitable video data to output the area video data; and
  calculating suitable area exposure condition based on the area video data,
wherein the calculating sets the suitable area exposure condition to the imaging sensor and the signal processor,
a controller that determines input of a pan operation or a tilt operation,
wherein when the pan operation or the tilt operation is input, the processing circuitry is further configured to perform a block photometric calculating of a suitable area exposure condition for the partial area based on the suitable block exposure condition for each video data block corresponding to the partial area obtained from the memory, and sets the suitable area exposure condition to the imaging sensor and the signal processor.

4. A video data transmitting apparatus comprising:
an imaging apparatus, including:
  an imaging sensor;
  a signal processor that analyses video data obtained from the imaging sensor, calculates a suitable exposure condition for an entire area of the video data to set the suitable exposure condition to the imaging sensor, and outputs suitable video data imaged on the suitable exposure condition;
  a memory; and
  processing circuitry configured to perform:
    clipping area video data from a partial area of the suitable video data to output the area video data; and
    calculating a suitable area exposure condition based on the area video data,
  wherein the calculating sets the suitable area exposure condition to the imaging sensor and the signal processor,
  wherein the processing circuitry is further configured to perform a block photometric calculating that divides the suitable video data obtained from the signal processor into a plurality of video data blocks, and calculates a suitable block exposure condition for each of the video data blocks to store the suitable block exposure condition in the memory,
  wherein the block photometric calculating calculates the suitable area exposure condition by calculating a weighted average value for the suitable block exposure condition for each of the video data blocks corresponding to the partial area, and
  wherein when a region having a plurality of video data blocks in the partial area does not conform to the partial area, a weighted average value is a total of a coefficient multiplied by an exposure time based on an occupancy to the partial area of the video data blocks,
wherein the exposure condition is an exposure time,
an enlargement processor that generates enlarged video data having a required size based on the area video data clipped by the clipping; and
a transmitter that transmits the enlarged video data to a video data receiver of a partner station via a network.

5. A video data transmitting and receiving system comprising:
a video data transmitting apparatus, including:
  an imaging apparatus, including:
    an imaging sensor;
    a signal processor that analyses video data obtained from the imaging sensor, calculates a suitable exposure condition for an entire area of the video data to set the suitable exposure condition to the imaging sensor, and outputs suitable video data imaged on the suitable exposure condition;
    a memory; and
    processing circuitry configured to perform:
      clipping area video data from a partial area of the suitable video data to output the area video data; and
      calculating a suitable area exposure condition based on the area video data,
    wherein the calculating sets the suitable area exposure condition to the imaging sensor and the signal processor,
    wherein the processing circuitry is further configured to perform a block photometric calculating that divides the suitable video data obtained from the signal processor into a plurality of video data blocks, and calculates a suitable block exposure condition for each of the video data blocks to store the suitable block exposure condition in the memory,
    wherein the block photometric calculating calculates the suitable area exposure condition by calculating a weighted average value for the suitable block exposure condition for each of the video data blocks corresponding to the partial area, and
    wherein when a region having a plurality of video data blocks in the partial area does not conform to the partial area, a weighted average value is a total of a coefficient multiplied by an exposure time based on an occupancy to the partial area of the video data blocks;

an enlargement processor that generates enlarged video data having a required size based on the area video data clipped by the clipping; and a transmitter that transmits the enlarged video data to a video data receiver of a partner station via a network, the video data transmitting and receiving system further comprising a video data receiver that receives the enlarged video data from the video data transmitting apparatus to display the enlarged video data, wherein the exposure condition is an exposure time.

6. An image processing method using an imaging apparatus which comprises:

an imaging sensor;

a signal processor that analyses video data obtained from the imaging sensor, calculates a suitable exposure condition for an entire area of the video data to set the suitable exposure condition to the imaging sensor, and outputs suitable video data imaged on the suitable exposure condition;

a memory; and processing circuitry configured to perform:
clipping area video data from a partial area of the suitable video data to output the area video data; and
calculating a suitable area exposure condition based on the area video data, wherein the calculating sets the suitable area exposure condition to the imaging sensor and the signal processor, wherein the processing circuitry is further configured to perform a block photometric calculating that divides the suitable video data obtained from the signal processor into a plurality of video data blocks, and calculates a suitable block exposure condition for each of the video data blocks to store the suitable block exposure condition in the memory, wherein the block photometric calculating calculates the suitable area exposure condition by calculating a weighted average value for the suitable block exposure condition for each of the video data blocks corresponding to the partial area, and wherein when a region having a plurality of video data blocks in the partial area does not conform to the partial area, a weighted average value is a total of a coefficient multiplied by an exposure time based on an occupancy to the partial area of the video data blocks, and wherein the exposure condition is an exposure time, the method comprising:

a step of clipping the area video data from the partial area of the suitable video data to output the area video data; and a step of calculating the suitable area exposure condition based on the area video data, wherein the step of calculating the suitable area exposure condition sets the area exposure condition to the imaging sensor and the signal processor.

7. A non-transitory computer-readable computer medium storing a program, wherein the program is executed on:

an imaging apparatus, including:

an imaging sensor;

a signal processor that analyses video data obtained from the imaging sensor, calculates a suitable exposure condition for an entire area of the video data to set the suitable exposure condition to the imaging sensor, and outputs suitable video data imaged on the suitable exposure condition;

a memory; and processing circuitry configured to perform:
clipping area video data from a partial area of the suitable video data to output the area video data; and
calculating a suitable area exposure condition based on the area video data, wherein the calculating sets the suitable area exposure condition to the imaging sensor and the signal processor, wherein the processing circuitry is further configured to perform a block photometric calculating that divides the suitable video data obtained from the signal processor into a plurality of video data blocks, and calculates a suitable block exposure condition for each of the video data blocks to store the suitable block exposure condition in the memory, wherein the block photometric calculating calculates the suitable area exposure condition by calculating a weighted average value for the suitable block exposure condition for each of the video data blocks corresponding to the partial area, and wherein when a region having a plurality of video data blocks in the partial area does not conform to the partial area, a weighted average value is a total of a coefficient multiplied by an exposure time based on an occupancy to the partial area of the video data blocks, and wherein the exposure condition is an exposure time, the program for executing:

a step of clipping the area video data from the partial area of the suitable video data to output the area video data; and a step of calculating the suitable area exposure condition based on the area video data, wherein the step of calculating the suitable area exposure condition sets the area exposure condition to the imaging sensor and the signal processor.

* * * * *